(12) United States Patent
Huang

(10) Patent No.: US 10,454,889 B2
(45) Date of Patent: Oct. 22, 2019

(54) AUTOMATIC ANOMALY DETECTION FRAMEWORK FOR GRID RESOURCES

(71) Applicant: Oath Inc., New York, NY (US)

(72) Inventor: Zicheng Huang, Beijing (CN)

(73) Assignee: Oath Inc., New York, NY (US)

( * ) Notice: Subject to any disclaimer, the term of this patent is extended or adjusted under 35 U.S.C. 154(b) by 82 days.

(21) Appl. No.: 14/923,033

(22) Filed: Oct. 26, 2015

(65) Prior Publication Data

US 2017/0118099 A1    Apr. 27, 2017

(51) Int. Cl.
G06F 15/173 (2006.01)
H04L 29/06 (2006.01)
G06F 11/30 (2006.01)

(52) U.S. Cl.
CPC .......... *H04L 63/00* (2013.01); *G06F 11/30* (2013.01)

(58) Field of Classification Search
CPC ............................ G06F 11/30; H04L 63/00
See application file for complete search history.

(56) References Cited

U.S. PATENT DOCUMENTS

| | | | | |
|---|---|---|---|---|
| 5,155,439 A * | 10/1992 | Holmbo | ............... | G01R 31/11 324/527 |
| 9,842,209 B2 * | 12/2017 | Tamir | ................. | G06F 21/552 |
| 2002/0124012 A1 * | 9/2002 | Liem | ................. | G06F 9/5066 |
| 2007/0213922 A1 * | 9/2007 | Van Buer | ........... | G08G 1/0104 701/117 |
| 2009/0082031 A1 * | 3/2009 | Kim | ................. | H04W 72/1263 455/452.2 |
| 2010/0046378 A1 * | 2/2010 | Knapp | .............. | H04L 41/0604 370/242 |
| 2011/0119100 A1 * | 5/2011 | Ruhl | .................. | G06F 17/3089 705/7.11 |
| 2013/0205286 A1 * | 8/2013 | Barraclough | ......... | G06F 8/443 717/151 |
| 2015/0169369 A1 * | 6/2015 | Baskaran | ............. | G06F 9/4881 718/102 |
| 2016/0034314 A1 * | 2/2016 | Xu | ....................... | G06F 9/4887 718/103 |
| 2016/0371170 A1 * | 12/2016 | Salunke | ............. | G06F 11/3612 |
| 2017/0063896 A1 * | 3/2017 | Muddu | .............. | H04L 63/1425 |

OTHER PUBLICATIONS

Krishnamurthy, Ganesan et al., "Monitoring Workflows with WF, monitoring workflows with WF for enhanced application data visibility," © 2015 Microsoft, downloaded from https://msdn.microsoft.com/en-us/library/cc299397.aspx.

* cited by examiner

*Primary Examiner* — June Y Sison
*Assistant Examiner* — Dixon F Dabipi
(74) *Attorney, Agent, or Firm* — Cooper Legal Group, LLC

(57) ABSTRACT

In one embodiment, a workflow data structure may be generated, updated, or obtained. The workflow data structure may represent system processes, relationships among the system processes, data input to the system processes, data generated by the system processes, and estimated running times associated with the system processes, wherein the data generated by the system processes includes a plurality of metrics. A scheduling map may be generated or updated based, at least in part, on the relationships among the system processes and the estimated running times associated with the system processes, where the scheduling map indicates estimated times at which the metrics are anticipated to be available. The metrics may be monitored based, at least in part, on the scheduling map. Anomalies may be detected according to a result of monitoring the metrics.

25 Claims, 7 Drawing Sheets

AUTOMATIC ANOMALY DETECTION FRAMEWORK FOR GRID RESOURCES

BACKGROUND OF THE INVENTION

The disclosed embodiments relate generally to computer-implemented methods and apparatus for performing anomaly detection.

Anomaly detection typically refers to the identification of items, events, or observations which do not conform to an expected pattern or other items in a dataset. Anomaly detection can be an important tool in a variety of domains, such as intrusion detection, fraud detection, and system health monitoring. Anomaly detection may also be used in preprocessing to remove anomalous data from the dataset.

SUMMARY OF THE INVENTION

In one embodiment, a workflow data structure may be obtained, generated or updated. The workflow data structure may represent system processes, relationships among the system processes, data input to the system processes, data generated by the system processes, and estimated running times associated with the system processes, where the data generated by the system processes includes a plurality of metrics. A scheduling map may be generated or updated based, at least in part, on the relationships among the system processes and the estimated running times associated with the system processes, where the scheduling map indicates estimated times at which the plurality of metrics are anticipated to be available. The metrics may be monitored based, at least in part, on the scheduling map. Anomalies may be detected according to a result of monitoring the plurality of metrics.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Figure 1:
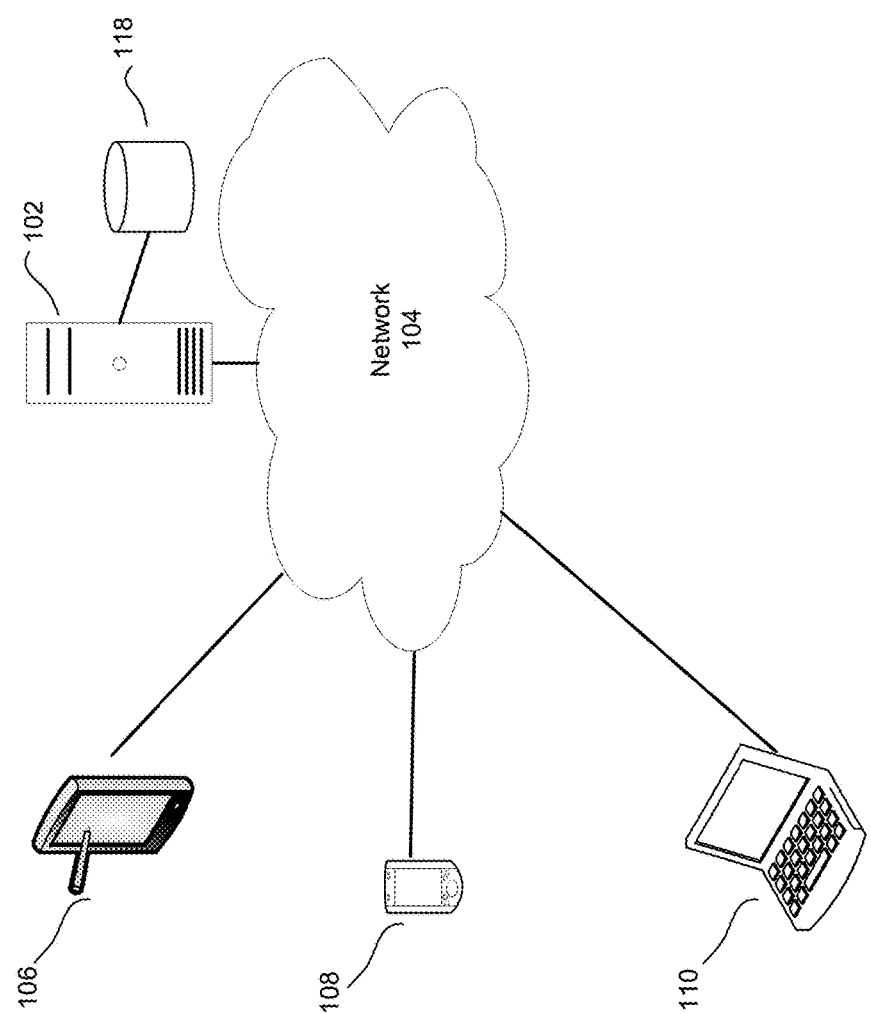
FIG. 1 is a diagram illustrating an example system in which embodiments of the invention may be implemented.

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Metrics are often collected by systems to monitor system performance and the health of system components. For example, metrics may be used to monitor the degree of user engagement, health of a content pool, and/or status of user profiles. However, sometimes the generation of metrics is delayed due to errors in upstream data sources or other failures. If anomalies in the metrics are not identified within a period of time, significant losses can occur.

Often, metrics are monitored manually via dashboards or other mechanisms. However, as metric computation becomes more complicated and relies on multiple datasets, such manual monitoring has become more difficult to perform in a timely and effective manner.

The disclosed embodiments support the automated detection of anomalies. An example system in which automated anomaly detection may be performed will be described in further detail below with reference to FIG. 1.

Example System

FIG. 1 is a diagram illustrating an example system in which various embodiments may be implemented. As shown in FIG. 1, the system may include one or more servers 102 associated with a web site such as Yahoo, Facebook, Tumblr, LinkedIn, Flickr, and Meme. The server(s) 102 may enable the web site to provide a variety of services to its users. More particularly, the server(s) 102 may include a web server, search server, an email server, and/or content server.

In accordance with various embodiments, the server(s) 102 may perform anomaly detection to detect anomalies in data. More particularly, anomaly detection may be performed to detect anomalies in metrics generated via system processes. Anomaly detection may also be performed on raw data such as user profiles, transactional data representing user interactions with the web site or interactions with content provided by the web site, or system data pertaining to system functionality. Similarly, anomaly detection may be performed on intermediate data that is generated by a first set of system processes, but is to be further processed by a second set of system processes in the generation of metric(s).

Anomaly detection may be performed for a variety of purposes. For example, the data may include security data such as voice data, enabling speaker verification to be performed or security breaches to be detected. As another example, the data may pertain to emails or user accounts such as email accounts, enabling spammers or fraudulent accounts to be identified. As yet another example, the data may include user data such as user demographics, data pertaining to user interactions with a web site or data pertaining to user interactions with content provided by the web site. User data may be stored in a user profile, as will be described in further detail below.

A content server may store content for presentation to users. For example, a content server may store web pages available on the Internet or data gathered via the Internet. As another example, a content server may be an "ad server" that stores online advertisements for presentation to users. "Ad serving" refers to methods used to place online advertisements on web sites, in applications, or other places where users are more likely to see them, such as during an online session.

In accordance with various embodiments, a plurality of web properties may be accessed via a web portal. Each web property may include a plurality of web pages that provide access to different categories of content. Example web properties include Mail, News, Sports, Finance, Weather, Autos, Homes, Dating, Jobs, Shopping, Parenting, Health, Style, Beauty, Food, Movies, Travel, Answers, Careers, Celebrity, Fantasy Baseball, Fantasy Football, Fantasy Sports, Flickr, Games, Groups, Horoscopes, Local, Maps, Messenger, Music, Search, Small Business, Tech, and TV.

A plurality of clients 106, 108, 110 may access a web service on a web server via a network 104. For example, the clients 106, 108, 110 may view web pages of the web site. More particularly, the clients 106, 108, 110 may access web pages of a web property via a web portal associated with the web server. As another example, the clients 106, 108, 110 may send or receive emails.

The network 104 may take any suitable form, such as a wide area network or Internet and/or one or more local area networks (LAN's). The network 104 may include any suitable number and type of devices, e.g., routers and switches, for forwarding search or web object requests from each client to the search or web application and search or web results back to the requesting clients.

The disclosed embodiments may also be practiced in a wide variety of network environments (represented by network 104) including, for example, TCP/IP-based networks, telecommunications networks, wireless networks, etc. In addition, computer program instructions with which embodiments of the invention may be implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Embodiments disclosed herein may be implemented via the server(s) 102 and/or the clients 106, 108, 110. For example, various features may be implemented via a web browser and/or application on the clients 106, 108, 110. The disclosed embodiments may be implemented via software and/or hardware.

A variety of mechanisms may be implemented to support the generation of user profiles including, but not limited to, collecting or mining navigation history, stored documents, tags, or annotations, to provide a few examples. Profiles of users of a search engine, for example, may give a search engine provider a mechanism to retrieve annotations, tags, stored pages, navigation history, or the like, which may be useful for making relevance determinations of search results, such as with respect to a particular user.

In accordance with various embodiments, the server(s) 102 may have access to one or more user logs 118 (e.g., user databases) into which user information is retained for each of a plurality of users. This user information or a portion thereof may be referred to as a user profile. More particularly, the user profile may include public information that is available in a public profile and/or private information. The user logs 118 may be retained in one or more memories that are coupled to the server 102.

The user information retained in the user logs 118 may include personal information such as demographic information (e.g., age, occupation, and/or gender) and/or geographic information (e.g., residence address, work address, zip code, and/or area code). In addition, each time a user performs online activities such as clicking on a web page or an advertisement, or purchasing goods or services, information regarding such activity or activities may be retained as user data in the user logs 118. For instance, the user data that is retained in the user logs 118 may indicate the identity of web sites visited, identity of ads that have been selected (e.g., clicked on) and/or a timestamp. In addition, the user data may indicate a purchase history with respect to various products, services, types of products, and/or types of services. The user data may also indicate one or more interests of the user.

The user logs 118 may further include query logs into which search information is retained. Each time a user performs a search on one or more search terms, information regarding such search may be retained in the query logs. For instance, the user's search request may contain any number of parameters, such as user or browser identity and the search terms, which may be retained in the query logs. Additional information related to the search, such as a timestamp, may also be retained in the query logs along with the search request parameters. When results are presented to the user based on the entered search terms, parameters from such search results may also be retained in the query logs. For example, an identity of the specific search results (e.g., Uniform Resource Locators (URLs)), such as the web sites, the order in which the search results are presented, whether each search result is a sponsored or algorithmic search result, the owner (e.g., web site) of each search result, and/or whether each search result is selected (i.e., clicked on) by the user (if any), may be retained in the query logs.

Anomaly Detection

Figure 2A:
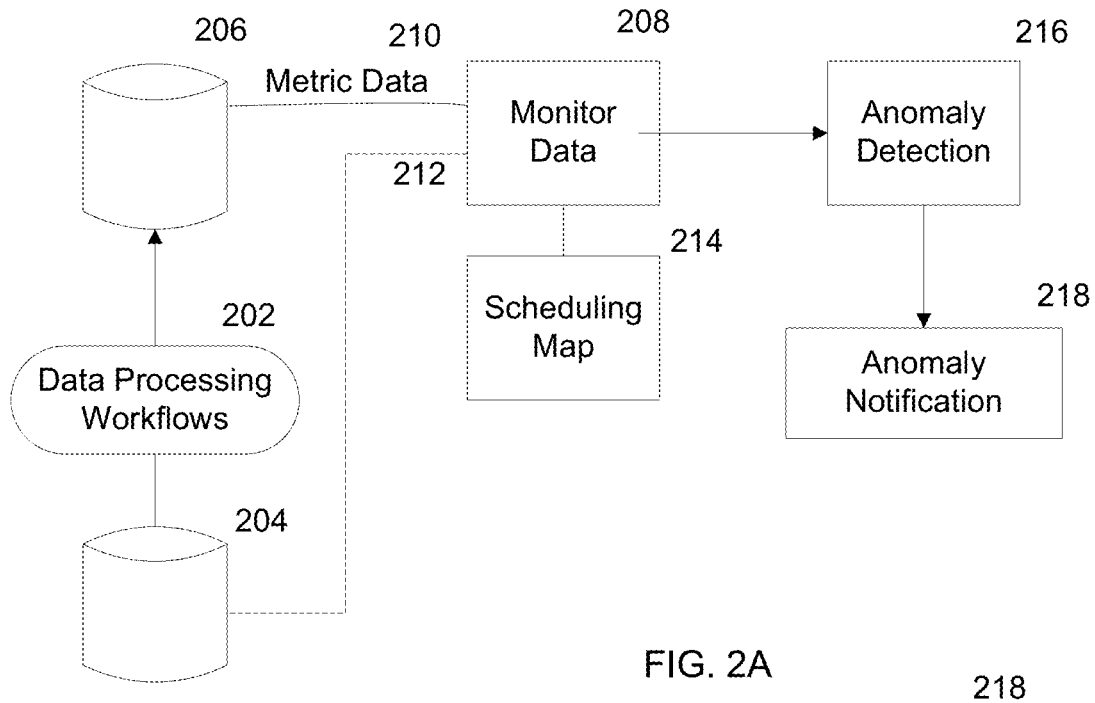
FIG. 2A is a block diagram illustrating an example anomaly detection system that may be implemented in accordance with various embodiments.

FIG. 2A is a block diagram illustrating an example anomaly detection system that may be implemented in accordance with various embodiments. The anomaly detection system may monitor data generated by a plurality of workflows 202. More particularly, each of the data processing workflows 202 may include a series of system processes that operate as a "pipeline" to process data 204 to generate output data. Data that is output by a workflow may include one or more metrics 206 and/or may include intermediate data that will be input to another workflow. Thus, the data 204 that is processed by the workflows 202 may include raw data, as well as intermediate data.

The data 204 may be retrieved from one or more data stores (e.g., memories). As described above, the data may include user profiles or a portion thereof. Thus, the data may represent user interactions with the web site or content provided by the web site. In addition, the data may include content maintained by the web site.

At least some of the data processing workflows 202 may process data 204 to generate metrics 206. Metrics may represent various system events such as user interactions (e.g., web browsing or purchases) with the web site, communications (e.g., electronic mails) transmitted or received via the web site, system health monitoring, etc. Thus, a metric may include a measurement that may be used to gauge the performance of the web site (e.g., hardware and/or software components of the system supporting the web site) or the associated business. Example metrics include, but are not limited to, number of visitors of the web site during a particular time period, number of purchases during a particular time period, average response time provided to web site visitors, etc.

A metric may be calculated based upon data that has been collected during a particular time period. For example, data may be gathered and processed every hour. In some instances, a metric may be a total value representing all activity during the time period. In other instances, a metric may be an average or mean value that has been calculated using the data gathered during the time period.

The system may monitor data 208 by interacting with the data stores to retrieve (or attempt to retrieve) data including metric data 210 associated with a plurality of metrics. The system may also monitor raw data and/or intermediate data 212.

In one embodiment, the system monitors data 208 according to a scheduling map 214. The scheduling map 214 may indicate, for each one of the plurality of metrics, the time(s) that metric data corresponding to that metric will be available for retrieval. A mechanism for generating a scheduling map will be described in further detail below.

As data is monitored, anomaly detection 216 may be performed to detect anomalies in the data. In accordance with various embodiments, two different types of anomalies may be detected. First, anomalies may include erroneous data values. Second, anomalies may include "missing" data. More particularly, when the anomaly detection system attempts to retrieve metric data for a particular metric after the time(s) that the metric data is scheduled to be available, the metric data may be determined to be "missing data" if the metric data is not present in the data store(s).

Various anomaly detection rules may be applied to detect abnormal data values. In one embodiment, the anomaly detection rules may indicate, for each of the plurality of metrics, an acceptable range of values. Thus, an abnormal metric value may be detected by comparing the metric value with the acceptable range of values for that metric. In another embodiment, a sequential analysis technique is applied to detect abnormal metric values.

During application of sequential analysis, a cumulative sum of a dataset for a particular metric is used. When the value of the cumulative sum exceeds a particular threshold value, a change in the dataset is found. More particularly, timestamps associated with a metric value set $\{X_n\}$ for a particular metric may be scanned for a specific range of time. The time range may be a composition of a baseline time window and a detection time window. The metric values may be divided into two different subsets, $X_B$ and $X_D$, that correspond to these two different time windows. The baseline window is used for reference and the detection window is the one under detection. The cumulative sums for the baseline window may be calculated as:

$$C_{BP} = avg\left(\sum_{x_i in X_B} \max(0, x_i - avg(X_B))\right)$$

$$C_{BN} = avg\left(\sum_{x_i in X_B} \min(0, x_i - avg(X_B))\right)$$

$C_{BP}/C_{BN}$ is the average of the positive/negative change in the baseline window. During the detection, a quality characteristic of the metric values in the detection window may be computed as:

$$T = avg\left(\sum_{x_i in X_D} x_i - avg(X_B)\right)$$

The value of T represents the change in the metric values in the detection window in relation to the baseline window. T may be compared with $C_{BP}$ and $C_{BN}$ to determine whether an anomaly is detected for the metric within the detection window.

Anomaly detection 216 may also include identification of the cause(s) of an anomaly. The cause(s) of an anomaly may be ascertained, for example, via various anomaly detection rules.

Anomaly notification 218 may be performed to notify various individuals, systems, or system components of anomalies in metrics or intermediate data. More particularly, anomaly notification 218 may be performed according to various anomaly notification rules. The anomaly notification rules may indicate the circumstances in which notifications are to be transmitted, the manner in which the notifications are to be transmitted, and entities/individuals to whom the notifications are to be transmitted. The anomaly notification rules may treat the two different types of anomalies differently. In one embodiment, anomaly notification 218 may be performed automatically for erroneous data values, while the system may attempt to resolve missing data before transmitting notifications of the missing data. In some embodiments, abnormal data values may be removed (e.g., deleted) from the data stores.

Figure 2B:
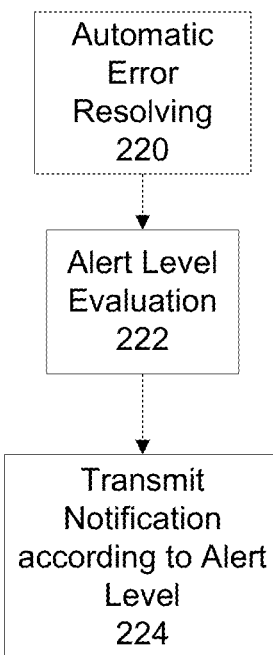
FIG. 2B is a diagram illustrating an example method of performing automatic error resolution.

FIG. 2B is a diagram illustrating an example anomaly notification process that may be performed for missing data. As shown in this example, the system may attempt to perform automatic error resolving 220 to resolve an instance of missing data for a particular metric. More particularly, the system may wait a period of time and attempt to retrieve the missing data after the period of time has lapsed. If the data is still missing after the period of time, the system may send a notification or may repeat the automatic resolution process by waiting a further period of time to resolve the missing data, as described above. If the data can be retrieved after the period of time, a notification may not be transmitted by the anomaly detection system.

In accordance with various embodiments, the system may maintain an alert level for each missing metric data value. For example, the alert level may be initialized to 1. The system may wait a period of time to attempt to retrieve the previously missing data and raise the alert level. The anomaly detection system may then determine if the metric is available after this period of time. If the metric data is still determined to be missing after the period of time, the system may evaluate the alert level for the missing metric 222, as described below. The system may repeatedly wait a further period of time and raise the alert level according to various detection rules. Therefore, the alert level may reflect the period of time that has passed since the corresponding metric was expected to be available.

The system may periodically evaluate the alert level for the missing metric data 222. More particularly, if the alert level for a metric reaches a threshold value, the system may transmit a notification (e.g., alert message). Thus, the notification may be transmitted based, at least in part, on the alert level 224. Stated another way, if a metric is determined to be unavailable after a period of time, a notification may be transmitted based, at least in part, on the amount of time that has passed since the metric was expected to be available.

In some embodiments, the system may transmit a single notification for a given missing metric. In other embodiments, the system may transmit multiple notifications for a missing metric. For example, the system may transmit a first notification when the metric is initially determined to be missing, and a second notification when the alert level for the metric reaches a threshold value (e.g., 2 or 3).

The mechanism via which a notification is transmitted may be determined based, at least in part, on the alert level or time that has passed since the data was expected to be available (according to the scheduling map). Notifications may be transmitted via various mechanisms including, but not limited to, electronic mail, web dashboard, or text message. For example, for alert level 1, the notification may be transmitted via electronic mail and for alert level 2, the notification may be transmitted via text message. Similarly, the individual(s) or entities to whom a notification is transmitted may be determined based, at least in part, on the alert level or time that has passed since the data was expected to be available.

The status of each metric or anomaly may be maintained in an error log. In some embodiments, a notification of the change in status of a metric may be provided via a dashboard or other mechanism, as described herein. In addition, all anomalies may be tracked to ensure that automatic anomaly resolution and/or notification has been performed for each metric.

In accordance with various embodiments, the data processing workflows that generate metrics for which anomaly detection is performed are represented in a data structure representing the system processes underlying the workflows. More particularly, the data structure may represent the system processes, relationships among the system processes, data input to the system processes, and data generated by the system processes, where the data generated by the system processes include a plurality of metrics. In addition, the data structure may represent estimated running times associated with the system processes, enabling the anomaly detection system to estimate the time(s) at which metric data will be available for retrieval. The data structure may also represent any delays associated with the data that is input to the system processes. As will be described in further detail below with reference to FIG. 3, the data structure may include a directed graph.

Figure 3:
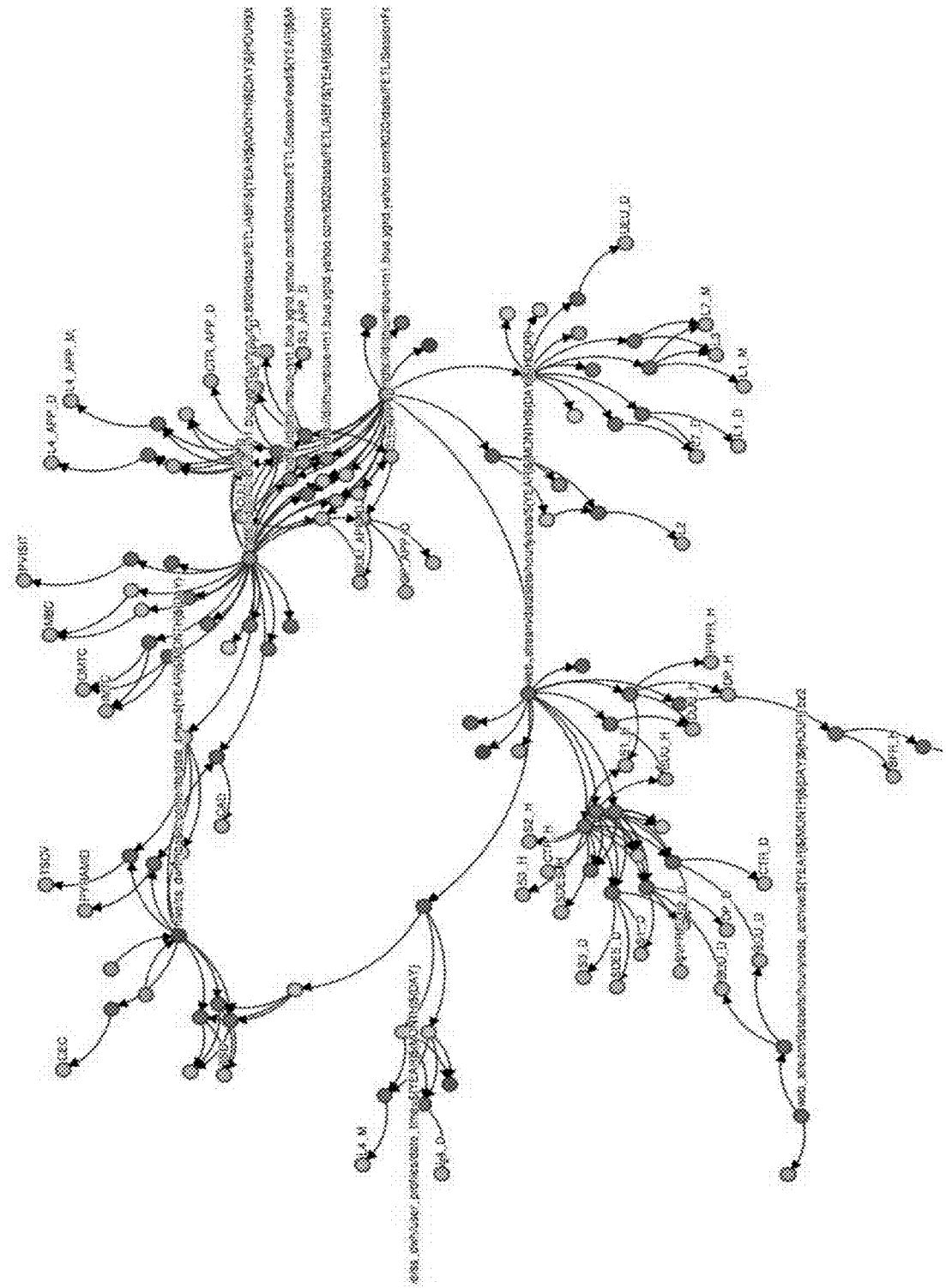
FIG. 3 is a diagram illustrating an example directed graph that may be generated in accordance with various embodiments.

FIG. 3 is a diagram illustrating an example directed graph that may be generated in accordance with various embodiments. A directed graph may represent relationships among system processes of the data workflows. Edges of the directed graph may represent the system processes, while nodes of the directed graph may represent data. More particularly, nodes of the directed graph may include input nodes representing data input to the system processes and output nodes representing data generated by the system processes. The data generated by the system processes may include a plurality of metrics. In accordance with various embodiments, values assigned to the edges of the directed graph may represent estimated running times associated with the system processes.

The directed graph may include three different types of nodes: central node (i.e., root node), intermediate node, and leaf node. The central node may be connected to one or more intermediate nodes via corresponding edges, where the central node represents input data of the system processes represented by the connected edges. The central node may represent data retrieved from a data source storing raw data. For example, each central node may represent a corresponding raw data feed.

An intermediate node may represent an intermediate dataset that has been generated by a first system process, where the dataset is further processed as input data by a second system process. Thus, an intermediate node will be connected to at least two edges representing these two different system processes. An intermediate node may be connected to another intermediate node, the central node, and/or a leaf node.

A leaf node may be connected to an intermediate node via an edge representing a system process that generated the data represented by the leaf node. For example, a leaf node may represent metric data for which anomaly detection is performed. Data represented by a leaf node is not input to another system process represented in the directed graph.

Figure 4:
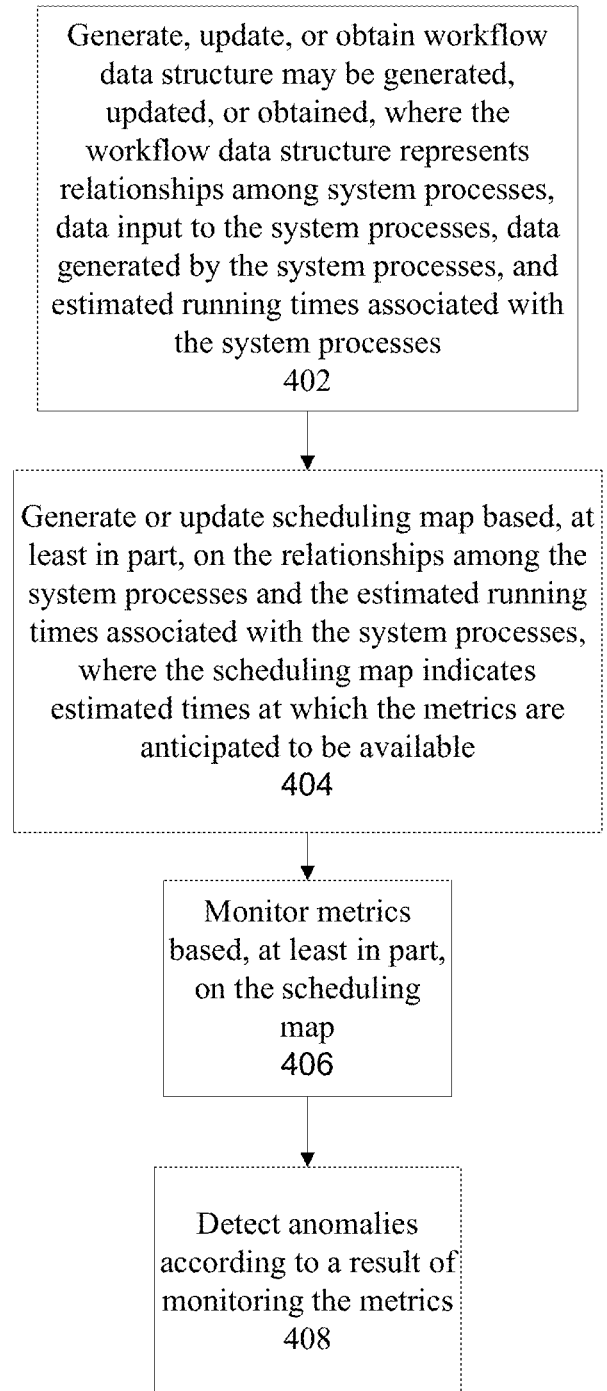
FIG. 4 is a process flow diagram illustrating an example method of performing anomaly detection in accordance with various embodiments.

FIG. 4 is a process flow diagram illustrating an example method of performing anomaly detection in accordance with various embodiments. A workflow data structure may be generated, updated, or obtained at 402, where the workflow data structure represents relationships among a plurality of system processes, data input to the system processes, data generated by the system processes, and estimated running times associated with the system processes. As described above, the data generated by the system processes may include a plurality of metrics. In addition, the workflow data structure may further represent delays associated with at least a portion of the data input to the system processes. For example, the data structure may indicate that various input data is available every 2 hours.

In one embodiment, the workflow data structure is a directed graph, where nodes of the directed graph represent the data input to the system processes and the data generated by the system processes, edges of the directed graph represent the system processes, and values assigned to the edges of the directed graph represent the estimated running times associated with the system processes. In addition, values associated with various nodes of the directed graph may represent delays associated with corresponding data.

Delays associated with the input data may be ascertained based, at least in part, on the frequency or period with which various data is received. For example, input data may include feeds that are received hourly, daily, or weekly.

In some embodiments, statistical analysis of the latencies of the input data and/or the running times of the workflows may be performed to ascertain patterns that indicate when workflows will be triggered and when they will finish within a given time range. The workflow data structure may be updated with the latencies and/or running times. For example, nodes of a directed graph may be updated with corresponding latencies and edges of the directed graph may be updated with running times.

Workflows may be triggered at specific times based, at least in part, on the latencies of its input data. Similarly, workflows may be anticipated to be completed based, at least in part, on the latencies of the input data and the corresponding running times.

A scheduling map may be generated or updated at 404 based, at least in part, on the relationships among the system processes and the estimated running times associated with the system processes, where the scheduling map indicates estimated times at which the plurality of metrics are anticipated to be available. In addition, the scheduling map may be generated based, at least in part, on any delays associated with the input data. For example, the scheduling map may be generated by processing a workflow data structure such as that described above. The scheduling map may be maintained in a data structure such as a table or linked list.

The plurality of metrics may be monitored at 406 based, at least in part, on the scheduling map. More particularly, each of the plurality of metrics may be retrieved or checked at or after the corresponding time at which the metric is anticipated to be available (e.g., generated by a corresponding workflow). In this manner, it is possible to perform data monitoring and anomaly detection according to a schedule that predicts the times at which the metrics will be available.

Anomalies may be detected according to a result of monitoring the plurality of metrics at 408. More particularly, detection of anomalies of metrics may be performed in conjunction with or immediately following monitoring of the various metrics. Detection of anomalies may include detection of missing metric(s). In addition, detection of anomalies may include detection of abnormal values of various metrics.

In addition to detecting anomalies in metrics, the anomaly detection system may also perform anomaly detection for intermediate data that is generated by various workflows. More particularly, the scheduling map may indicate estimated times at which the intermediate data is anticipated to be available, the intermediate data may be monitored according to the scheduling map, and anomalies (e.g., missing datasets) may be detected according to a result of monitoring the intermediate data.

Notifications may be transmitted according to various anomaly detection rules, as described herein. A notification may pertain to metric(s) or intermediate data. Where a value is determined to be abnormal (e.g., outside an expected range of values), a notification may be transmitted based, at least in part, on the value. For example, the mechanism via which a notification is transmitted and/or addressee(s) of the notification may be determined based, at least in part, on the value. Where a metric or other data is determined to be missing, the anomaly detection system may attempt to automatically resolve the missing data. If the missing data is not resolved, a notification of the missing data may be transmitted based, at least in part, upon the time that has elapsed since the data was expected to be available or a corresponding alert level.

Network

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content Distribution Network

A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Peer-to-Peer Network

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Wireless Network

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Internet Protocol

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes LANs, WANs, wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Network Architecture

Figure 5:
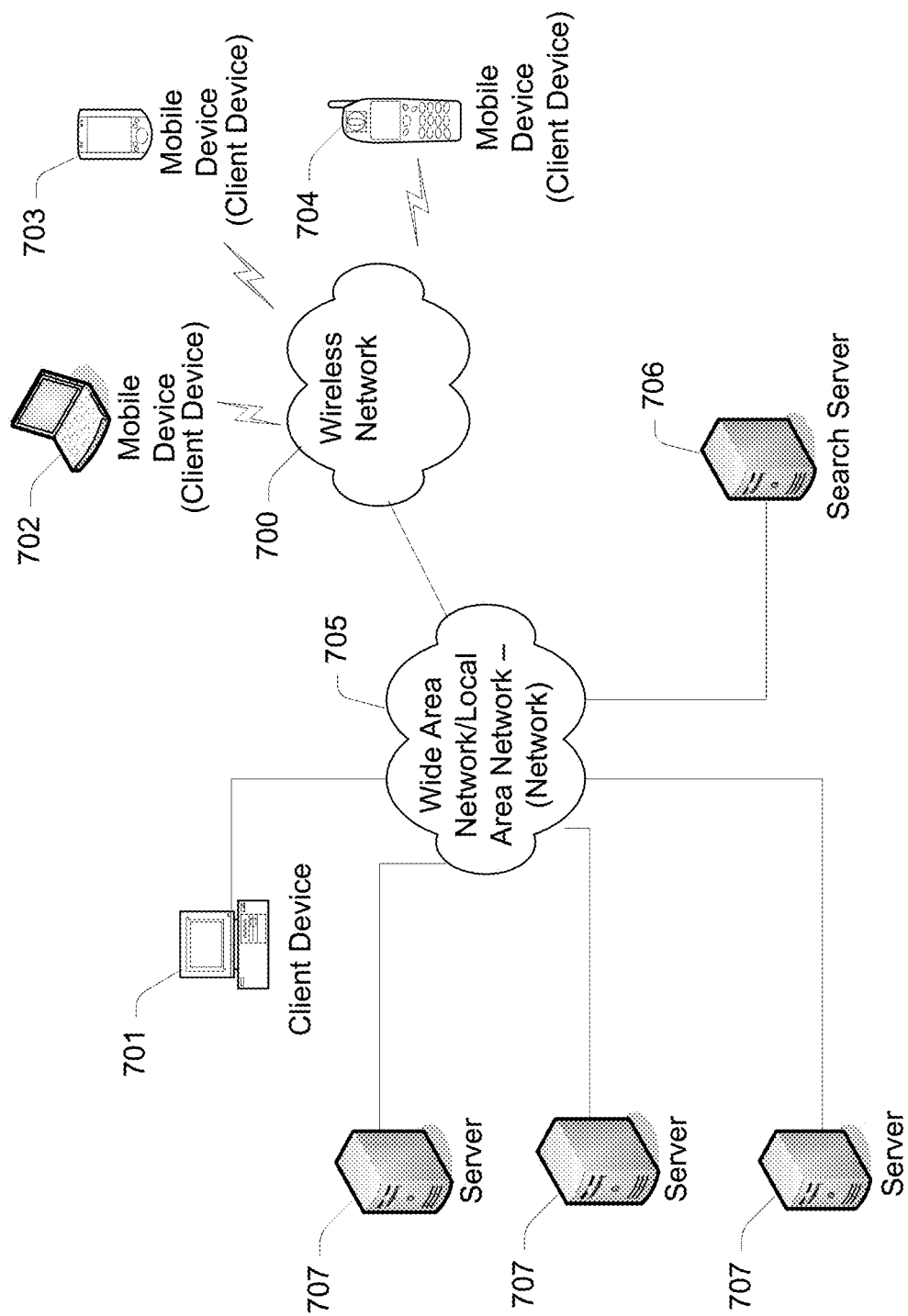
FIG. 5 is a schematic diagram illustrating an example embodiment of a network in which various embodiments may be implemented.

The disclosed embodiments may be implemented in any of a wide variety of computing contexts. FIG. 5 is a schematic diagram illustrating an example embodiment of a network. Other embodiments that may vary, for example, in terms of arrangement or in terms of type of components, are also intended to be included within claimed subject matter. Implementations are contemplated in which users interact with a diverse network environment. As shown, FIG. 5, for example, includes a variety of networks, such as a LAN/WAN 705 and wireless network 700, a variety of devices, such as client devices 701-704, and a variety of servers such as content server(s) 707 and search server 706. The servers may also include an ad server (not shown). As shown in this example, the client devices 701-704 may include one or more mobile devices 702, 703, 704. Client device(s) 701-704 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The disclosed embodiments may be implemented in some centralized manner. This is represented in FIG. 5 by server(s) 707, which may correspond to multiple distributed devices and data store(s). The server(s) 707 and/or corresponding data store(s) may store user account data, user information, and/or content.

Server

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content Server

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

Figure 6:
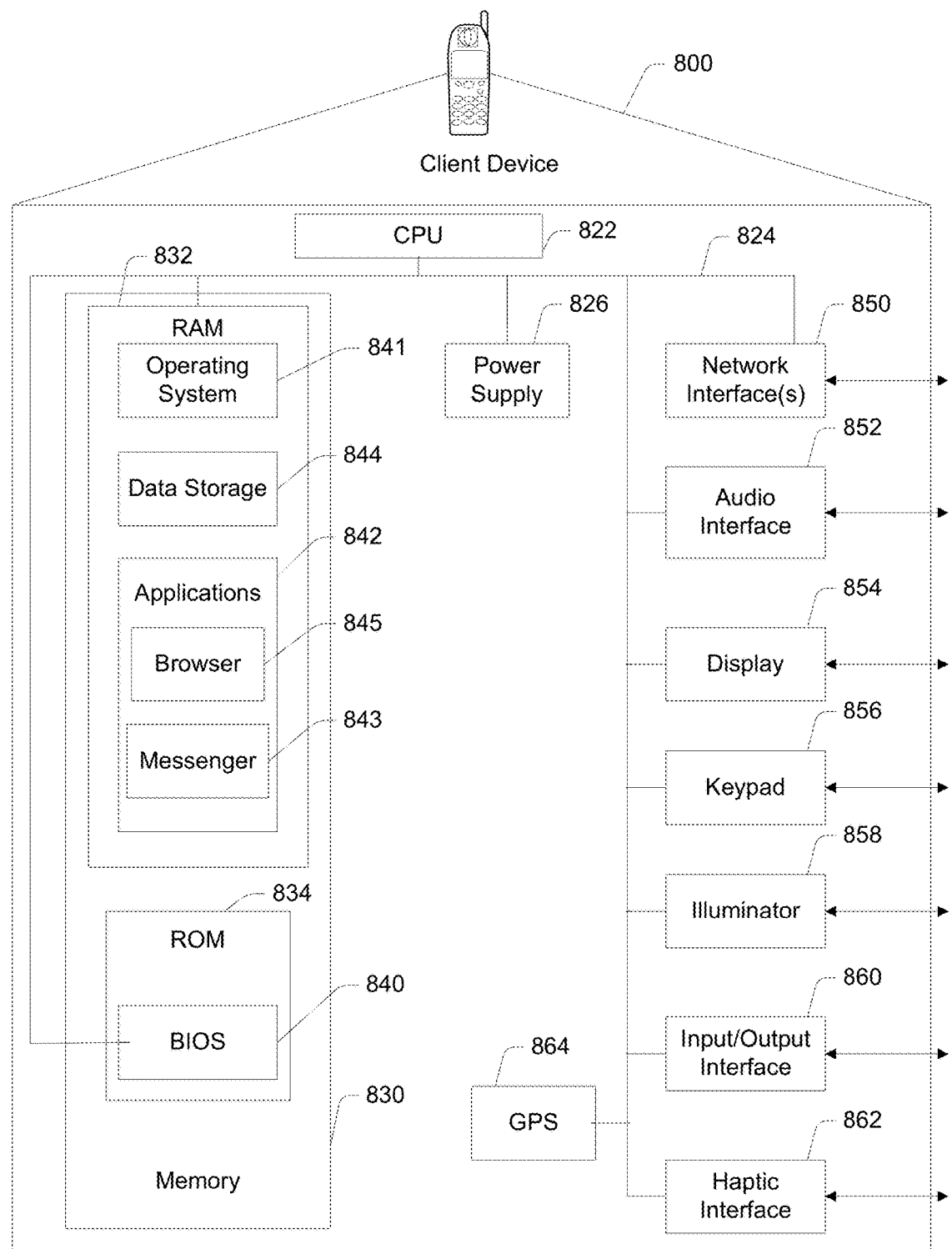
FIG. 6 is a schematic diagram illustrating an example client device in which various embodiments may be implemented.

FIG. 6 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 800 may include one or more central processing units (CPUs) 822, which may be coupled via connection 824 to a power supply 826 and a memory 830. The memory 830 may include random access memory (RAM) 832 and read only memory (ROM) 834. The ROM 834 may include a basic input/output system (BIOS) 840.

The RAM 832 may include an operating system 841. More particularly, a client device may include or may execute a variety of operating systems, including a personal computer operating system, such as a Windows, iOS or Linux, or a mobile operating system, such as iOS, Android, or Windows Mobile, or the like. The client device 800 may also include or may execute a variety of possible applications 842 (shown in RAM 832), such as a client software application such as messenger 843, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 844. A client device may also include or execute an application such as a browser 845 to perform a variety of possible tasks, such as browsing, searching, playing various forms of content, including locally stored or streamed video, or games (such as fantasy sports leagues).

The client device 800 may send or receive signals via one or more interface(s). As shown in this example, the client device 800 may include one or more network interfaces 850. The client device 800 may include an audio interface 852. In addition, the client device 800 may include a display 854 and an illuminator 858. The client device 800 may further include an Input/Output interface 860, as well as a Haptic Interface 862 supporting tactile feedback technology.

The client device 800 may vary in terms of capabilities or features. Claimed subject matter is intended to cover a wide range of potential variations. For example, a cell phone may include a keypad such 856 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 864 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

In some embodiments, an identity of the user (e.g., owner) of the client device may be statically configured. Thus, the device may be keyed to an owner or multiple owners. In other embodiments, the device may automatically determine the identity of the user of the device. For instance, a user of the device may be identified by deoxyribonucleic acid (DNA), retina scan, and/or finger print.

Figure 7:
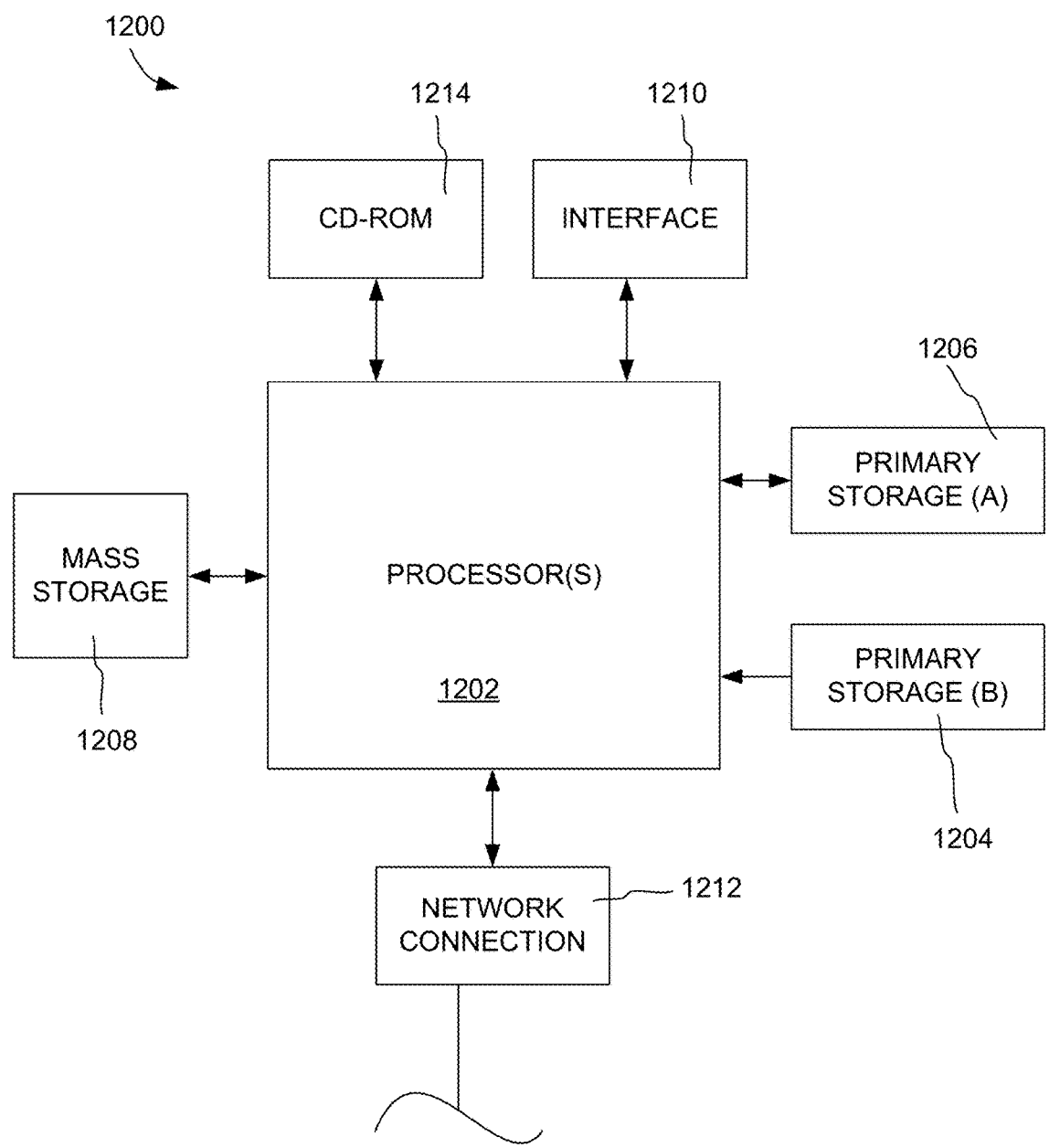
FIG. 7 is a schematic diagram illustrating an example computer system in which various embodiments may be implemented.

FIG. 7 illustrates a typical computer system that, when appropriately configured or designed, can serve as a system via which various embodiments may be implemented. The computer system 1200 includes any number of CPUs 1202 that are coupled to storage devices including primary storage 1206 (typically a RAM), primary storage 1204 (typically a ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. Moreover, a system implementing various embodiments may be a portable device, such as a laptop or cell phone. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
    generating or updating, by one or more servers, a directed graph representing relationships among a plurality of system processes of a computing system, wherein edges of the directed graph represent the system processes, values assigned to the edges of the directed graph represent estimated running times associated with the system processes, and nodes of the directed graph include input nodes representing data input to the system processes and output nodes representing data generated by the system processes, wherein the data generated by the system processes include a plurality of metrics;
    generating or updating, by the one or more servers, a scheduling map based, at least in part, on the relationships among the system processes and the estimated running times associated with the system processes, wherein the scheduling map indicates estimated times at which the plurality of metrics are anticipated to be available for retrieval from one or more data stores;
    monitoring, by the one or more servers, the plurality of metrics generated by the system processes, wherein monitoring includes interacting with the one or more data stores based, at least in part, on the scheduling map;
    detecting, by the one or more servers, anomalies according to a result of monitoring the plurality of metrics; and
    transmitting, by the one or more servers via a network, a notification pertaining to the anomalies that have been detected.

2. The method as recited in claim 1, wherein the directed graph further represents latencies associated with at least a portion of the input nodes, and wherein the scheduling map is generated or updated based, at least in part, on the latencies.

3. The method as recited in claim 1, wherein detecting anomalies in the monitored plurality of metrics comprises detecting an anomaly in a value of one of the plurality of metrics based upon one or more anomaly detection rules.

4. The method as recited in claim 1, wherein detecting anomalies in the monitored plurality of metrics comprises determining that one of the plurality of metrics is not present in the one or more data stores.

5. The method as recited in claim 4, further comprising:
    responsive to determining that one of the plurality of metrics is not present in the one or more data stores,
        waiting a period of time;
        raising an alert level;
        ascertaining whether the one of the plurality of metrics is present in the one or more data stores after the period of time; and
        transmitting a notification based, at least in part, on the alert level and whether the one of the plurality of metrics is present in the one or more data stores after the period of time.

6. The method as recited in claim 4, further comprising:
    responsive to determining that one of the plurality of metrics is not present in the one or more data stores,
        waiting a period of time;
        ascertaining whether the one of the plurality of metrics is present in the one or more data stores after the period of time; and
        transmitting a notification based, at least in part, on the period of time and whether the one of the plurality of metrics is present in the one or more data stores after the period of time.

7. A non-transitory computer-readable storage medium storing thereon computer-readable instructions comprising:
    instructions for generating or updating, by one or more servers, a workflow data structure representing system processes of a computing system, relationships among the system processes, data input to the system processes, data generated by the system processes, and estimated running times associated with the system processes, wherein the data generated by the system processes includes a plurality of metrics;

instructions for generating or updating, by the one or more servers, a scheduling map based, at least in part, on the relationships among the system processes and the estimated running times associated with the system processes, wherein the scheduling map indicates estimated times at which the plurality of metrics are anticipated to be available for retrieval from one or more data stores;

instructions for monitoring, by the one or more servers, the plurality of metrics generated by the system processes, wherein monitoring includes interacting with the one or more data stores based, at least in part, on the scheduling map;

instructions for detecting, by the one or more servers, anomalies according to a result of monitoring the plurality of metrics; and instructions for transmitting, by the one or more servers via a network, a notification pertaining to the anomalies that have been detected.

8. The non-transitory computer-readable storage medium as recited in claim 7, wherein the workflow data structure further represents latencies associated with at least a portion of the data input to the system processes, and wherein the scheduling map is generated or updated based, at least in part, on the latencies.

9. The non-transitory computer-readable storage medium as recited in claim 7, wherein the workflow data structure comprises a directed graph, wherein nodes of the directed graph represent the data input to the system processes and the data generated by the system processes, wherein edges of the directed graph represent the system processes, and wherein values assigned to the edges of the directed graph represent the estimated running times associated with the system processes.

10. The non-transitory computer-readable storage medium as recited in claim 7, wherein detecting anomalies in the monitored plurality of metrics comprises detecting an anomaly in a value of one of the plurality of metrics based upon one or more anomaly detection rules.

11. The non-transitory computer-readable storage medium as recited in claim 7, wherein detecting anomalies in the monitored plurality of metrics comprises determining that one of the plurality of metrics is not present in the one or more data stores.

12. The non-transitory computer-readable storage medium as recited in claim 11, further comprising:
instructions for transmitting a notification pertaining to the one of the plurality of metrics.

13. The non-transitory computer-readable storage medium as recited in claim 11, further comprising:
instructions for waiting a period of time responsive to determining that one of the plurality of metrics is not present in the one or more data stores;
instructions for raising an alert level;
instructions for ascertaining whether the one of the plurality of metrics is present in the one or more data stores after the period of time; and
instructions for transmitting a notification based, at least in part, on the alert level and whether the one of the plurality of metrics is present in the one or more data stores after the period of time.

14. The non-transitory computer-readable storage medium as recited in claim 11, further comprising:

instructions for waiting a period of time responsive to determining that one of the plurality of metrics is not present in the one or more data stores; and
instructions for ascertaining whether the one of the plurality of metrics is present in the one or more data stores after the period of time;
wherein the notification is transmitted based, at least in part, on the period of time and whether the one of the plurality of metrics is present in the one or more data stores after the period of time.

15. An apparatus, comprising:
a processor; and
a memory, at least one of the processor or the memory being configured to:
obtain, generate, or update a workflow data structure representing system processes, relationships among the system processes of a computing system, data input to the system processes, data generated by the system processes, and estimated running times associated with the system processes, wherein the data generated by the system processes includes a plurality of metrics;
generate or update a scheduling map based, at least in part, on the relationships among the system processes and the estimated running times associated with the system processes, wherein the scheduling map indicates estimated times at which the plurality of metrics are anticipated to be available for retrieval from one or more data stores;
monitor the plurality of metrics generated by the system processes by interacting with the one or more data stores based, at least in part, on the scheduling map;
detect anomalies according to a result of monitoring the plurality of metrics; and
transmit, via a network, a notification pertaining to the anomalies that have been detected.

16. The apparatus as recited in claim 15, wherein the workflow data structure further represents latencies associated with at least a portion of the data input to the system processes, and wherein the scheduling map is generated or updated based, at least in part, on the latencies.

17. The apparatus as recited in claim 15, wherein the workflow data structure comprises a directed graph, wherein nodes of the directed graph represent the data input to the system processes and the data generated by the system processes, wherein edges of the directed graph represent the system processes, and wherein values assigned to the edges of the directed graph represent the estimated running times associated with the system processes.

18. The apparatus as recited in claim 15, wherein detecting anomalies in the monitored plurality of metrics comprises detecting an anomaly in a value of one of the plurality of metrics based upon one or more anomaly detection rules.

19. The apparatus as recited in claim 15, wherein detecting anomalies in the monitored plurality of metrics comprises determining that one of the plurality of metrics is not present in the one or more data stores.

20. The apparatus as recited in claim 19, wherein at least one of the processor or the memory are further configured to:
responsive to determining that one of the plurality of metrics is not present in the one or more data stores, wait a period of time; and
ascertain whether the one of the plurality of metrics is present in the one or more data stores after the period of time; and
wherein the notification is transmitted based, at least in part, on the period of time and whether the one of the plurality of metrics is present in the one or more data stores after the period of time.

21. The method as recited in claim 1, the plurality of metrics comprising a measurement of performance of at least one of hardware or software components of the computing system.

22. The apparatus as recited in claim 18, the one or more anomaly detection rules indicating an acceptable range of values of one of the plurality of metrics.

23. The method as recited in claim 1, wherein detecting anomalies according to a result of monitoring the plurality of metrics comprises applying a sequential analysis technique.

24. The method as recited in claim 1, the plurality of metrics comprising at least one of:
   a number of visitors of a web site supported by the computing system during a particular time period; or
   an average response time provided to the visitors of the web site.

25. The method as recited in claim 1, wherein monitoring is not one of the system processes.

* * * * *